United States Patent
Lu et al.

(10) Patent No.: US 11,547,904 B2
(45) Date of Patent: Jan. 10, 2023

(54) EXERCISE ASSISTING DEVICE AND EXERCISE ASSISTING METHOD

(71) Applicant: Institute For Information Industry, Taipei (TW)

(72) Inventors: Chia-Yu Lu, Taipei (TW); Shang-Ming Jen, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 512 days.

(21) Appl. No.: 16/705,185

(22) Filed: Dec. 5, 2019

(65) Prior Publication Data

US 2021/0138301 A1    May 13, 2021

(30) Foreign Application Priority Data

Nov. 13, 2019 (TW) .................................. 108141208

(51) Int. Cl.
*A63B 24/00*    (2006.01)
*G09B 19/00*    (2006.01)
(Continued)

(52) U.S. Cl.
CPC ......... *A63B 24/0006* (2013.01); *G06N 20/00* (2019.01); *G06V 40/23* (2022.01);
(Continued)

(58) Field of Classification Search
None
See application file for complete search history.

(56) References Cited

U.S. PATENT DOCUMENTS

| 8,613,666 B2 | 12/2013 | Esaki et al. |
| 9,898,675 B2 | 2/2018 | Yee et al. |

(Continued)

FOREIGN PATENT DOCUMENTS

| CN | 108853946 A | 11/2018 |
| CN | 109011508 A | 12/2018 |

(Continued)

OTHER PUBLICATIONS

Office Action to the corresponding Taiwan Patent Application rendered by the Taiwan Intellectual Property Office (TIPO) dated Nov. 3, 2020, 6 pages (including English translation).

*Primary Examiner* — Jason T Yen
(74) *Attorney, Agent, or Firm* — Birch, Stewart, Kolasch & Birch, LLP (57) ABSTRACT

An exercise assisting device and exercise assisting method are provided. The device performs the following operations: transmitting a first control signal, the first control signal is related to a motion demonstration video corresponding to an exercise course data; receiving a video stream of a user; analyzing the video stream to generate a motion recognition result corresponding to the exercise course data of the user, and determining whether a motion target value is achieved according to the motion recognition result and the exercise course data; and when the motion target value is not achieved, the motion recognition result and the motion target value are input into an expert suggestion model to generate a follow-up motion suggestion and to determine a follow-up motion demonstration video corresponding to the follow-up motion suggestion.

20 Claims, 4 Drawing Sheets

(51) Int. Cl.
*G06N 20/00* (2019.01)
*G06V 40/20* (2022.01)
(52) U.S. Cl.
CPC ........ *G09B 19/003* (2013.01); *A63B 24/0075* (2013.01); *A63B 2024/0009* (2013.01); *A63B 2024/0012* (2013.01); *G06V 40/25* (2022.01); *G09B 19/0038* (2013.01)

(56) References Cited

U.S. PATENT DOCUMENTS

| | | | | |
|---|---|---|---|---|
| 2012/0143358 | A1* | 6/2012 | Adams | A63F 13/814 700/92 |
| 2015/0258429 | A1 | 9/2015 | Pope et al. | |
| 2018/0036591 | A1* | 2/2018 | King | G09B 19/003 |
| 2018/0357472 | A1* | 12/2018 | Dreessen | G06V 40/23 |
| 2019/0362506 | A1* | 11/2019 | Leroyer | G06F 21/32 |
| 2020/0254311 | A1* | 8/2020 | Watterson | A63B 71/0622 |

FOREIGN PATENT DOCUMENTS

| | | |
|---|---|---|
| TW | I464696 | 12/2014 |
| TW | 201509487 A | 3/2015 |
| TW | M498612 | 4/2015 |
| TW | 201729879 A | 9/2017 |
| TW | I653076 B | 3/2019 |
| TW | I665572 B | 7/2019 |

* cited by examiner

EXERCISE ASSISTING DEVICE AND EXERCISE ASSISTING METHOD

PRIORITY

This application claims priority to Taiwan Patent Application No. 108141208 filed on Nov. 13, 2019, which is hereby incorporated by reference in its entirety.

FIELD

The present invention relates to an exercise assisting device and an exercise assisting method. More specifically, the present invention relates to a method for assisting a user in performing exercise training through an exercise assisting device.

BACKGROUND

In recent years, as the trend of exercise has become more and more popular and people have paid more attention to various demands of exercise. Various application programs and training courses for assisting users in self-exercise training have been successively launched in the market. However, general application programs and training courses available in the market usually only have standardized and fixed courses, e.g., only provide users with regular training courses for daily or weekly exercise, and no real-time analysis is made according to the training conditions of users at the time of exercising. Thus, it is impossible to give users training suggestions or change training courses immediately.

For example, under the current exercise assisting device, an application program may provide a partner training video for exercise (e.g., a teaching video for lifting dumbbells) to assist the user in training. However, when sports interruption, physical weakness, wrong posture, or unable to achieve an exercise course target (e.g., lifting a 10 kg dumbbell for 10 times with one hand) occur in the training process of the user, the application program cannot make real-time adjustment according to such conditions (e.g. change courses in time, suspend the video or make professional suggestions). As the user needs to judge the exercise condition thereof on his/her own, and the user usually does not have the professional knowledge to judge standards, it cannot be ensured that the user can correctly complete training motions and reach training goals, which reduces the training efficiency of the user.

Furthermore, even if some application programs can analyze the user's condition in real time, they still need user-wearable sensors to collect limb motion data of users, and different types of wearable sensors need to be replaced for different training courses. This causes limitation and inconvenience to the exercise training of the users, and thus these application programs are still unable to effectively assist the users in completing the training.

Accordingly, an urgent need exists in the art to provide a technology that can immediately generate follow-up motion suggestions and follow-up motion demonstration videos according to exercise conditions of users without the need of wearable sensors, thereby providing users with exercise assistance.

SUMMARY

Provided is an exercise assisting device. The exercise assisting device may comprise a transceiver interface, a storage and a processor, and the processor is electrically connected to the storage and the transceiver interface. The storage stores an exercise course data of a user, a plurality of motion demonstration videos and an expert suggestion model, wherein the exercise course data comprises a motion and a motion target value corresponding to the motion, and the exercise course data corresponds to one of the motion demonstration videos. The processor transmits a first control signal, and the first control signal is related to the motion demonstration video corresponding to the exercise course data. The processor receives a video stream of the user. The processor analyzes the video stream to generate a motion recognition result corresponding to the exercise course data of the user, and determines whether the motion target value corresponding to the motion is achieved according to the motion recognition result and the exercise course data. When it is determined that the motion target value is not achieved, the processor inputs the motion recognition result and the motion target value into the expert suggestion model to generate a follow-up motion suggestion and to determine a follow-up motion demonstration video corresponding to the follow-up motion suggestion, wherein the follow-up motion demonstration video is one of the motion demonstration videos.

Also provided is an exercise assisting method used for an electronic device, and the electronic device comprises a transceiver interface, a storage and a processor. The storage stores an exercise course data of a user, a plurality of motion demonstration videos and an expert suggestion model, wherein the exercise course data comprises a motion and a motion target value corresponding to the motion, and the exercise course data corresponds to one of the motion demonstration videos. The exercise assisting method is executed by the processor and comprises the following steps: transmitting a first control signal, the first control signal being related to the motion demonstration video corresponding to the exercise course data; receiving a video stream of the user; analyzing the video stream to generate a motion recognition result corresponding to the exercise course data of the user, and determining whether the motion target value corresponding to the motion is achieved according to the motion recognition result and the exercise course data; when it is determined that the motion target value is not achieved, inputting the motion recognition result and the motion target value into the expert suggestion model to generate a follow-up motion suggestion and to determine a follow-up motion demonstration video corresponding to the follow-up motion suggestion, wherein the follow-up motion demonstration video is one of the motion demonstration videos.

The exercise assisting technology (at least including the device and the method) provides the user with a motion demonstration video corresponding to the exercise course data based on the exercise course data of the user. After receiving an exercise video stream of the user, the exercise assisting technology automatically analyzes the exercise video stream to generate a motion recognition result, and determines whether the motion target value corresponding to the motion is achieved according to the motion recognition result and the exercise course data. When it is determined that the motion recognition result does not achieve the motion target value, the exercise assisting technology inputs the motion recognition result and the motion target value into an expert suggestion model to generate a follow-up motion suggestion and to determine a follow-up motion demonstration video corresponding to the follow-up motion suggestion. Moreover, the present exercise assisting technology can solve the problem in the prior art that the user conditions cannot be analyzed in real time to provide real-time adjustment without the need of wearable sensors, thereby effectively assisting the user in completing training.

The detailed technology and preferred embodiments implemented for the subject invention are described in the following paragraphs accompanying the appended drawings for people skilled in this field to well appreciate the features of the claimed invention.

DETAILED DESCRIPTION

In the following description, an exercise assisting device and an exercise assisting method provided in accordance with the present invention will be explained with reference to certain example embodiments thereof. However, these example embodiments are not intended to limit the present invention to any environment, example, embodiment, applications or implementations described in these example embodiments. Therefore, description of these example embodiments is only for purpose of illustration rather than to limit the scope of the present invention.

It should be appreciated that, in the following embodiments and the attached drawings, elements unrelated to the present invention are omitted from depiction; and dimensions of and dimensional scales among individual elements in the attached drawings are provided only for illustration, but not to limit the scope of the present invention.

Figure 1A:
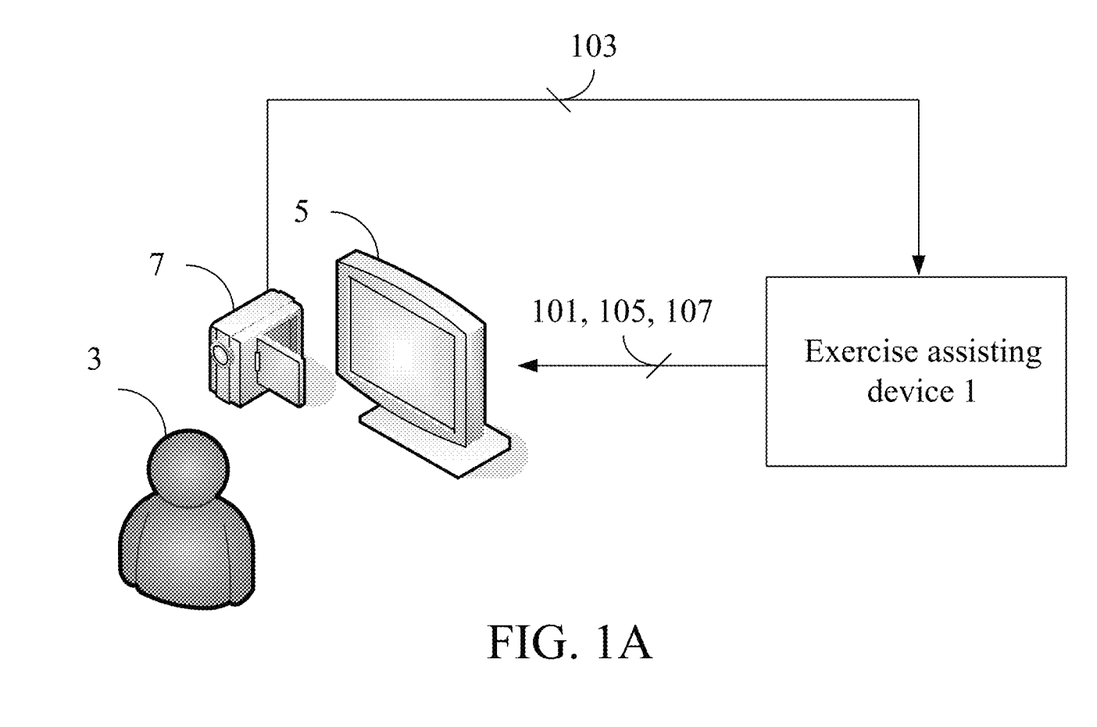
FIG. 1A is a schematic view depicting an application scenario of an exercise assisting device of a first embodiment.

First, an application scenario of an exercise assisting device of the present invention will be described, and a schematic view thereof is depicted in FIG. 1A. In this embodiment, the exercise assisting device 1 is connected to a plurality of external devices, e.g., devices such as a display screen 5, an image capturing device 7, a speaker (not shown) or the like, through a wired network or a wireless network. In some embodiments, the display screen 5 and the image capturing device 7 may be the same device, such as a smart phone. In some embodiments, the exercise assisting device 1, the display screen 5 and the image capturing device 7 may also be integrated into the same device. FIG. 1A is only for convenience of illustration, and the present invention does not limit the content of the exercise assisting device 1. It shall be noted that, the present invention does not limit the number of external devices connected to the exercise assisting device 1. For example, the exercise assisting device 1 may be simultaneously connected with a plurality of display screens and a plurality of image capturing devices through a network, depending on the scale and actual requirements of the exercise assisting device 1.

In the use scenario of the present invention, when the user 3 is to take an exercise course, the exercise assisting device 1 may already store in advance the exercise course data that the user 3 wants to take. The exercise assisting device 1 is connected to the display screen 5, provides the user 3 with relevant assisting information about the exercise (e.g., a motion demonstration video 101), and may interact with the user 3. The image capturing device 7 is used to generate a video stream 103 of the user 3 and transmit the video stream 103 back to the exercise assisting device 1 for analysis.

Figure 1B:
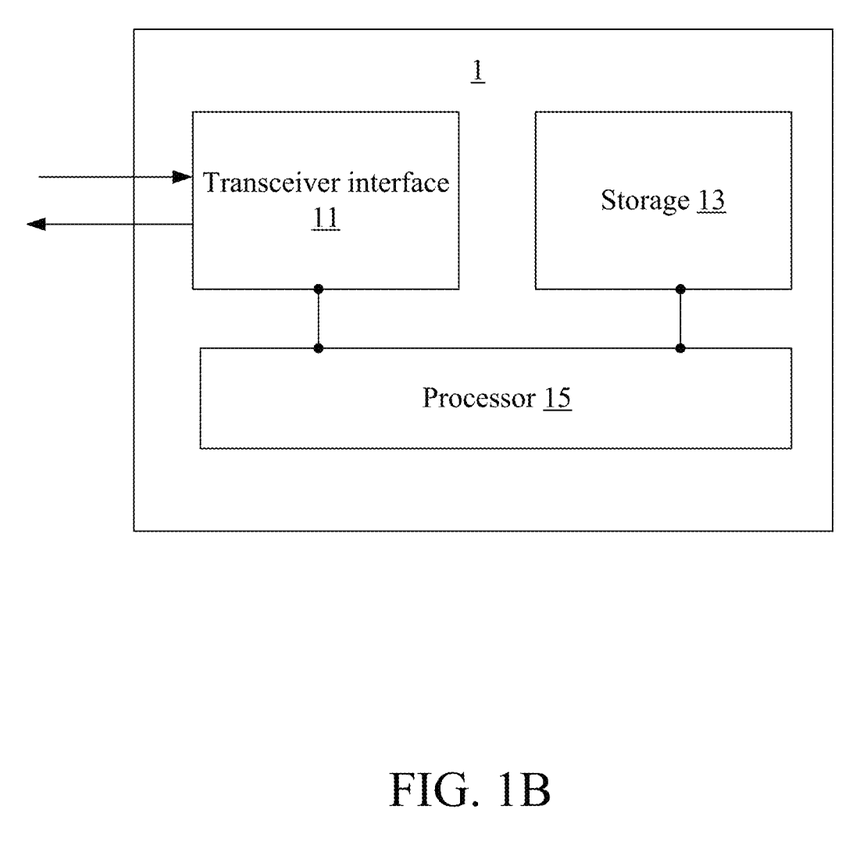
FIG. 1B is a schematic architectural view depicting the exercise assisting device of the first embodiment.

A first embodiment of the present invention is an exercise assisting device 1, and a schematic architectural view thereof is depicted in FIG. 1B. The exercise assisting device 1 comprises a transceiver interface 11, a storage 13 and a processor 15, and the processor 15 is electrically connected to the transceiver interface 11 and the storage 13. The transceiver interface 11 is an interface capable of receiving and transmitting data or other interfaces capable of receiving and transmitting data and known to those of ordinary skill in the art. In this embodiment, the transceiver interface 11 serves as an information communication medium with a plurality of external devices (e.g., the display screen 5 and the image capturing device 7), and the transceiver interface 11 is used for receiving and transmitting information such as control signals, motion demonstration videos, video streams of users, follow-up motion suggestions, follow-up motion demonstration videos or the like. Details will be described in the following paragraphs.

The storage 13 may be a memory, a universal serial bus (USB) disk, a hard disk, an optical disk, a mobile disk, or any other storage media or circuits with the same function and known to those of ordinary skill in the art. In this embodiment, the storage 13 stores an exercise course data (not shown) of the user 3, a plurality of motion demonstration videos (not shown) and an expert suggestion model (not shown), wherein the exercise course data comprises a motion and a motion target value corresponding to the motion, and the exercise course data corresponds to one of the motion demonstration videos.

For example, the exercise course data of the user 3 may comprise a plurality of exercise courses, and each of the exercise courses may comprise a plurality of motions, such as bending and lifting dumbbells, pushing dumbbells with shoulders, pushing barbells with shoulders, lying and pushing barbells or the like, and each motion corresponds to a motion target value. Each of the motion target values is the training goal corresponding to each of the exercise courses, e.g., a target value such as pushing 10 kg dumbbells for 10 times with shoulders, front raising a 20 kg barbell for 10 times, bending and lifting a 30 kg dumbbell for 15 times or the like. Each of the motion target value may be the standard set by a professional coach, and this will not be further described herein.

In this embodiment, the processor 15 may be one of various processors, central processing units, microprocessors, digital signal processors or other computing devices known to those of ordinary skill in the art. In some embodiments, the exercise assisting device 1 may be separately provided, or the exercise assisting device 1 is integrated into an external device such as a display screen or the like, and the contents thereof are not limited by the present invention.

For ease of understanding, the following paragraphs will describe the case where the exercise course data comprises a motion and a motion target value corresponding to the motion. The content when the exercise course data comprises multiple motions shall be appreciated by those of ordinary skill in the art according to the following contents, and thus will not be further described herein.

In this embodiment, the exercise assisting device 1 provides a motion demonstration video corresponding to each exercise course, and the motion demonstration video may provide the user 3 with a method to know the exercise posture and actual operation of each motion so as to assist the user in imitating the motion and avoid the occurrence of exercise injuries. The motion demonstration video may be generated by a virtual coach video (e.g., Avatar) or a pre-recorded video of an actual coach. It shall be noted that, the exercise course data may further contain other relevant information, such as the historical data of past training of the user, the performance of the user on the teaching content or the course or the like, and this will not be further described herein.

First, please refer to FIG. 1 for the overall operation of this embodiment. First, when the user 3 starts the exercise course data of the user, the exercise assisting device 1 first transmits the motion demonstration video 101 to the display screen 5 for viewing by the user 3, and the user 3 performs corresponding motions based on the motion demonstration video 101. Next, the exercise assisting device 1 receives the video stream 103 of the user 3 from the image capturing device 7, and the video stream 103 captures the images of motions of the user 3. Finally, the exercise assisting device 1 analyzes the video stream 103 to generate the follow-up motion suggestion 105 and generate the follow-up motion demonstration video 107, and transmits the follow-up motion suggestion 105 and the follow-up motion demonstration video 107 to the display screen 5 to adaptively adjust the exercise course of the user 3 and improve the efficiency of exercise. Details of each operation will be described in detail below.

Next, please refer to FIG. 1A and FIG. 1B for the specific operation of the exercise assisting device 1. First, the processor 15 transmits a first control signal, and the first control signal is related to the motion demonstration video 101 corresponding to the exercise course data. For example, when the user 3 is ready for training, the processor 15 may select, according to an exercise course data stored in the storage 13 (e.g., the motion of pushing 10 kg dumbbells with shoulders for 10 times), a motion demonstration video corresponding to the exercise course data, and transmit the motion demonstration video to the display screen 5 so that the user 3 operates according to the content of the display screen 5.

It shall be noted that, the exercise assisting device 1 may receive the exercise course data of the user 3 from an external device (e.g., a smart phone, a tablet, or other computer terminal devices or the like). The exercise assisting device 1 may also first perform related detection on the user 3 to evaluate the condition of the user 3 and then determine the exercise course data, when the user 3 uses the exercise assisting device 1 for related course training for the first time. For example, the processor 15 may use a muscle strength Repetition of Maximum (RM) evaluation method to provide a designed basic test item (e.g., pushing 20 kg with shoulders for 15 times) to be performed by the user 3 for trial. The image capturing device 7 receives the video stream 103 of the test item performed by the user 3, and the processor 15 analyzes the video stream of the test item performed to determine the actual completion value of the test item by the user 3 (e.g., the user 3 can only complete 10 times), and determines the exercise course data of the user 3 based on the actual completion value of these motions. In some embodiments, the user 3 has his/her own personal file (e.g., past training data), and the exercise assisting device 1 may determine the exercise course data of the user 3 according to the past training data.

Next, the exercise assisting device 1 receives the video stream 103 when the user 3 exercises for analysis, and determines the completion degree corresponding to the motion of the user 3 according to the video stream 103 (e.g., determines whether the actual motion gesture or number of motions completed by the user 3 achieves the motion target value after analyzing the video stream 103). Specifically, the processor 15 receives the video stream 103 from an external device (e.g., the image capturing device 7), and the video stream 103 is a video generated by the image capturing device 7 when the user 3 performs the motion. Thereafter, the processor 15 analyzes the video stream 103 to generate a motion recognition result corresponding to the exercise course data of the user 3, and determines whether the motion target value corresponding to the motion is achieved according to the motion recognition result and the exercise course data.

For example, the processor 15 may generate the motion recognition result through the following operations: generating human posture analysis through a real-time motion recognition technology (e.g., the paper "Realtime Multi-Person 2D Pose Estimation Using Part Affinity Fields" proposed by Zhe Cao et al. in 2018), and recognizing by the processor 15 a limb motion and a number of motions of the user 3 in the video stream 103 through technologies such as Bi-directional Long Short-Term Memory (BiLSTM), Attention neural networks and recursive neural networks or the like to generate the motion recognition result (e.g., it is recognized that the limb motion of the user 3 is pushing dumbbells with shoulders, and the number of motions is 8).

In some embodiments, some exercise courses further comprise the weight of an object used (e.g., the weight of dumbbells operated by the user) in addition to motions. Therefore, when performing the analysis of the video stream 103, the processor 15 further determines the object used by the user 3 when performing the motion in addition to determining the motion recognition result, thereby generating an object recognition result corresponding to the motion, and determining whether the motion of the user 3 corresponding to the exercise course data achieves the motion target value based on the object recognition result, the motion recognition result and the exercise course data.

Specifically, the object recognition result may be generated through the following operations: positioning a hand object in the video stream 103 by the processor 15 through a Region Proposal Networks (RPN) technology in the first place, and performing video clipping to generate an image for an object in hand corresponding to the video stream 103. Next, the processor 15 may recognize a type and weight of the object in hand through an object recognition technology (e.g., an Object Detection API provided by Google) to generate the object recognition result. For example, the processor 15 may recognize that the object operated by the user in the video stream 103 is a dumbbell and the weight thereof is 20 kg (e.g. the digits and letters shown on the dumbbell is "20 KG") through the aforementioned object recognition technology.

Next, when the processor 15 determines that the motion target value is not achieved (for example, only 80% of the motion target value is achieved regarding the number of times), the processor 15 inputs the motion recognition result and the motion target value into the expert suggestion model to generate a follow-up motion suggestion and to determine a follow-up motion demonstration video corresponding to the follow-up motion suggestion, wherein the follow-up motion demonstration video is one of the motion demonstration videos.

For example, after the user 3 takes the exercise course of pushing 10 kg dumbbells with shoulders for 10 times, the processor 15 determines that the user 3 has completed only 8 times according to the motion recognition result. After the processor 15 inputs the motion recognition result and the motion target value into the expert suggestion model, the expert suggestion model may provide a plurality of follow-up motion suggestions suitable for the user 3 under the current situation (for example, motion suggestions of pausing, giving up the training, maintaining the course, resting, changing to train other muscle groups, changing to other motions of the same muscle group, changing to a lighter weight, changing to a heavier weight, etc.), and generate a follow-up motion demonstration video according to the follow-up motion suggestion. For example, when the processor 15 determines that the user 3 has obviously failed to reach the target value, the follow-up motion suggestion generated by the expert suggestion model may be "resting" or changing to other gentle motions, and the processor 15 may thus generate a follow-up motion demonstration video such as "stretching".

As another example, after the user 3 takes the exercise course of pushing 10 kg dumbbells with shoulders for 10 times, the processor 15 determines that the user 3 has completed 12 times according to the motion recognition result. Since the processor 15 determines that the user 3 has obviously exceeded the target value, the follow-up motion suggestion generated by the expert suggestion model may be "changing to train other muscle groups" and "changing to a heavier weight". Therefore, the processor 15 generates a follow-up motion demonstration video such as "lying and pushing 20 kg barbells for 15 times".

In some embodiments, after the processor 15 inputs the motion recognition result and the motion target value into the expert suggestion model, the expert suggestion model may further provide a plurality of follow-up motion suggestions suitable for the user 3 under the current situation and the occurrence probability corresponding to each of the follow-up motion suggestions (e.g., the probability of recommending the user to rest is 75%). Next, the processor 15 sorts according to the occurrence probability corresponding to each of the follow-up motion suggestions generated by the expert suggestion model, and recommends the first n follow-up motion suggestions with the largest occurrence probabilities to the user (e.g., the first three follow-up motion suggestions with the largest occurrence probabilities), wherein n is a positive integer.

It shall be noted that, the expert suggestion model is established through one of deep learning or machine learning, such as the Attention network and Convolutional network, based on collecting a large number of samples, for example collecting a plurality of collected sample exercise course data, a motion evaluation and a coach suggestion corresponding to each of the collected sample exercise course data and other relevant data from various professional coaches or relevant research institutions. It shall be noted that, the expert suggestion model may be established and trained by the exercise assisting device 1 itself, or the expert suggestion model that has been trained may be directly received from an external device. The content and the establishing mode of the expert suggestion model shall be appreciated by those of ordinary skill in the art according to the above contents, and thus will not be further described herein.

In some embodiments, the exercise assisting device 1 further calculates the completed ratio of the target value according to the past training record of the user 3 so as to more accurately evaluate the physical condition of the user 3 and provide more appropriate follow-up motion suggestions and follow-up motion demonstration videos. Specifically, the storage 13 further stores historical record data corresponding to the user 3, and the historical record data includes a plurality of historical exercise courses and the motion target value corresponding to each of the historical exercise courses. The processor 15 is further configured to input the motion recognition result, the historical record data and the motion target value into the expert suggestion model, when it is determined that the motion target value is not achieved, so as to generate the follow-up motion suggestion and determine the follow-up motion demonstration video corresponding to the follow-up motion suggestion.

In some embodiments, the exercise assisting device 1 is further connected to a display screen (e.g., the aforementioned display screen 5), and after generating a follow-up motion suggestion and determining a follow-up motion demonstration video corresponding to the follow-up motion suggestion, the exercise assisting device 1 plays the follow-up motion suggestion and the follow-up motion demonstration video corresponding to the follow-up motion suggestion through the display screen to assist the user in performing subsequent training.

In some embodiments, in order to make the exercise assisting device 1 closer to needs of the user, the exercise assisting device 1 may further receive feedback information from the user 3 (e.g., through the display screen 5 with the touch function, or receive the user's voice through an additionally built microphone), and determine the follow-up motion demonstration video according to the feedback information. Specifically, after receiving a user feedback, the processor 15 inputs the motion recognition result, the motion target value, the user feedback, and the exercise course data into the expert suggestion model to generate the follow-up motion suggestion and to determine the follow-up motion demonstration video corresponding to the follow-up motion suggestion. It shall be noted that, the user feedback may be generated by a touch screen, a voice receiving device or the like, and the touch screen and the voice receiving device may also be integrated into the display screen 5 or the exercise assisting device 1. The form and source of the user feedback are not limited by the present invention.

In some embodiments, the exercise course data further comprises a sequence of motions, the sequence of motions comprises at least a first motion and a second motion, wherein the first motion corresponds to a first motion target value and a first motion demonstration video, and the second motion corresponds to a second motion target value and a second motion demonstration video. The exercise assisting device 1 plays the first motion demonstration video and the second motion demonstration video in this sequence. However, when the exercise assisting device 1 determines that the user 3 fails to complete the first motion target value, the exercise assisting device 1 will additionally determine a suitable follow-up motion demonstration video to replace the second motion demonstration video.

Specifically, the processor 15 first transmits the first control signal according to the sequence, wherein the first control signal corresponds to the first motion demonstration video. Next, the processor 15 receives the video stream 103 of the user 3 and analyzes the video stream 103 to generate the motion recognition result corresponding to the exercise course data of the user 3. Thereafter, the processor 15 further determines whether the motion achieves the first motion target value when the motion is determined to be the first motion according to the motion recognition result. When it is determined that the first motion target value is not met, the processor 15 inputs the motion recognition result and the first motion target value into the expert suggestion model to generate the follow-up motion suggestion and the follow-up motion demonstration video corresponding to the follow-up motion suggestion. Namely, the follow-up motion demonstration video is distinct from the exercise course data related to the first control signal. Finally, the processor 15 transmits a second control signal, wherein the second control signal corresponds to the follow-up motion demonstration video to replace the previous second motion demonstration video.

As can be known from the above description, the exercise assisting device 1 provided by the present invention provides the user 3 with a motion demonstration video corresponding to the exercise course data based on the exercise course data of the user 3, After receiving an exercise video stream 103 of the user 3, the exercise assisting device 1 automatically analyzes the exercise video stream 103 to generate a motion recognition result, and determines whether the motion target value corresponding to the motion is achieved according to the motion recognition result and the exercise course data. When it is determined that the motion recognition result does not achieve the motion target value, the exercise assisting device 1 inputs the motion recognition result and the motion target value into an expert suggestion model to generate a follow-up motion suggestion and to determine a follow-up motion demonstration video corresponding to the follow-up motion suggestion. Moreover, the present invention can solve the problem in the prior art that the user conditions cannot be analyzed in real time to provide real-time adjustment without the need of wearable sensors, thereby effectively assisting the user in completing training.

Figure 2:
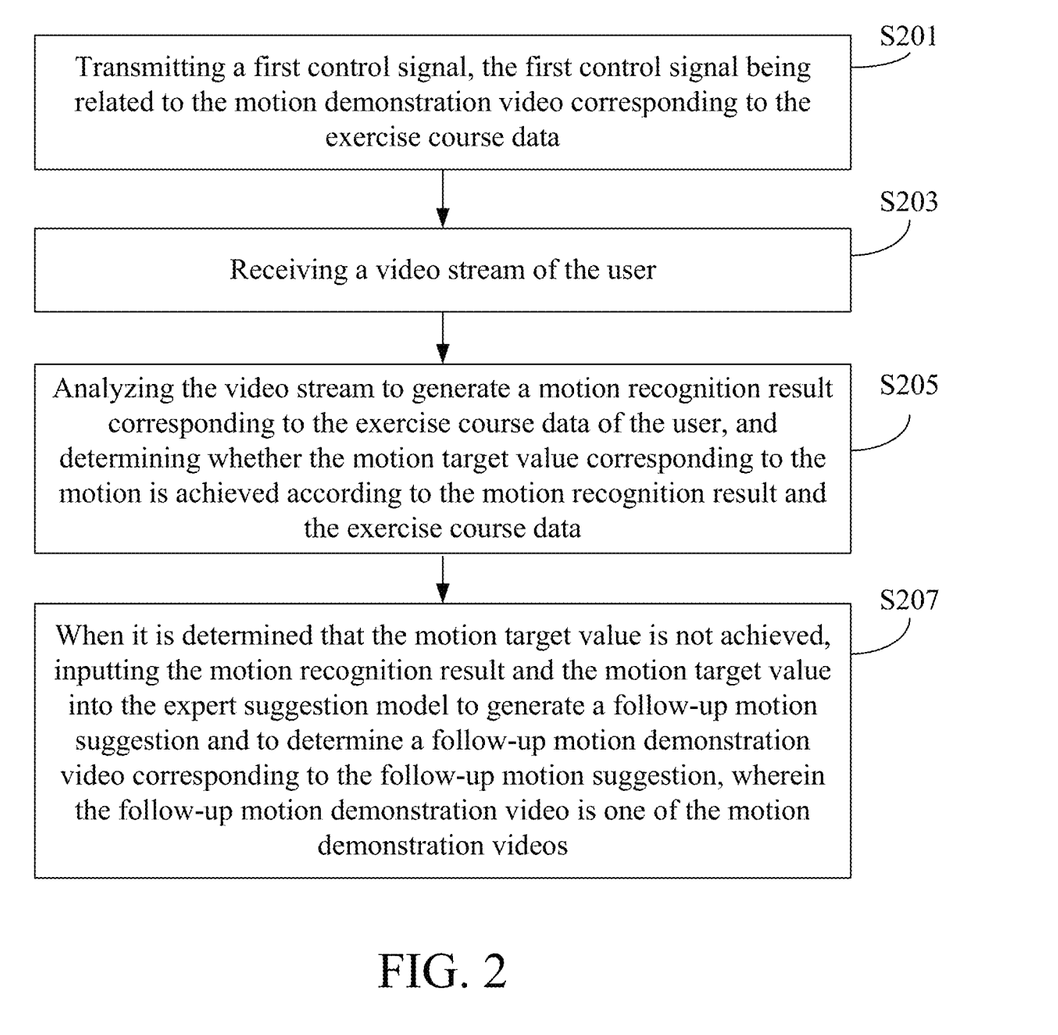
FIG. 2 is a part of a flowchart diagram depicting an exercise assisting method of a second embodiment.

A second embodiment of the present invention is an exercise assisting method, and a flowchart diagram thereof is depicted in FIG. 2. The exercise assisting method is used for an electronic device (e.g., the exercise assisting device 1 described in the first embodiment), the electronic device comprises a transceiver interface, a storage and a processor, the storage stores an exercise course data of a user, a plurality of motion demonstration videos and an expert suggestion model, wherein the exercise course data comprises a motion and a motion target value corresponding to the motion, and the exercise course data corresponds to one of the motion demonstration videos, and the exercise assisting method is executed by the processor. The exercise assisting method generates a follow-up motion suggestion and determines a follow-up motion demonstration video corresponding to the follow-up motion suggestion through steps S201 to S207.

In step S201, the electronic device transmits a first control signal, and the first control signal is related to the motion demonstration video corresponding to the exercise course data. Next, in step S203, the electronic device receives a video stream of the user.

Thereafter, in step S205, the electronic device analyzes the video stream to generate a motion recognition result corresponding to the exercise course data of the user, and determines whether the motion target value corresponding to the motion is achieved according to the motion recognition result and the exercise course data.

Finally, in step S207, when it is determined that the motion target value is not achieved, the electronic device inputs the motion recognition result and the motion target value into the expert suggestion model to generate a follow-up motion suggestion and to determine a follow-up motion demonstration video corresponding to the follow-up motion suggestion, wherein the follow-up motion demonstration video is one of the motion demonstration videos.

In some embodiments, the exercise assisting method further comprises the following steps when the analysis of the video stream is performed: generating an object recognition result corresponding to the motion; and determining whether the motion corresponding to the exercise course data of the user achieves the motion target value based on the object recognition result, the motion recognition result and the exercise course data.

In some embodiments, the exercise assisting method generates the object recognition result through the following steps: clipping the video stream to generate an image for an object in hand corresponding to the video stream; and recognizing a type and weight of the object in hand to generate the object recognition result.

In some embodiments, the storage further stores historical record data corresponding to the user, and the exercise assisting method further comprises the following step: inputting the motion recognition result, the historical record data and the motion target value into the expert suggestion model, when it is determined that the motion target value is not achieved, so as to generate the follow-up motion suggestion and to determine the follow-up motion demonstration video corresponding to the follow-up motion suggestion, wherein the historical record data comprises a plurality of historical exercise courses and the motion target value corresponding to each of the historical exercise courses.

In some embodiments, the exercise assisting method further comprises the following steps: determining the motion target value corresponding to the motion through a muscle strength Repetition of Maximum (RM) evaluation method.

In some embodiments, the exercise assisting method generates the motion recognition result through the following step: recognizing a limb motion and a number of motions of a user in the video stream to generate the motion recognition result.

In some embodiments, the exercise assisting method further comprises the following steps: generating an occurrence probability corresponding to each of the follow-up motion suggestions according to the expert suggestion model; and recommending the first n follow-up motion suggestions with the greatest occurrence probabilities to the user according to the occurrence probabilities, wherein n is a positive integer.

In some embodiments, the expert suggestion model in the exercise assisting method is established by one of a deep learning and a machine learning from a plurality of collected sample exercise course data and a motion evaluation and a coach suggestion corresponding to each of the collected sample exercise course data.

In some embodiments, the electronic device of the exercise assisting method is further connected to a display screen, and the exercise assisting method further comprises the following step: playing the follow-up motion suggestion and the follow-up motion demonstration video corresponding to the follow-up motion suggestion through the display screen.

In some embodiments, the follow-up motion demonstration video corresponding to the follow-up motion suggestion in the exercise assisting method is generated by the following steps: receiving a user feedback; and inputting the motion recognition result, the motion target value, the user feedback and the exercise course data into the expert suggestion model to generate the follow-up motion suggestion and to determine the follow-up motion demonstration video corresponding to the follow-up motion suggestion.

Figure 3:
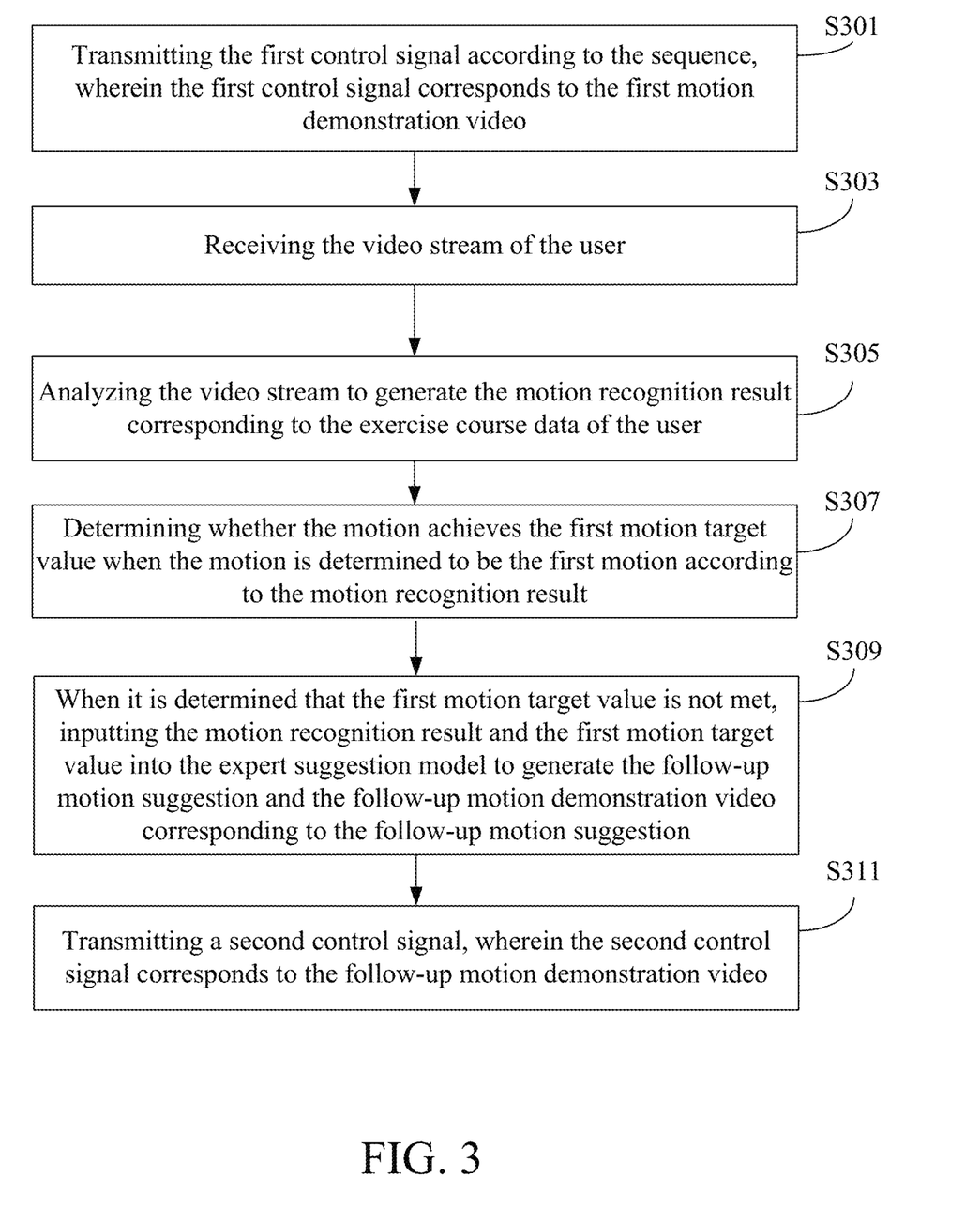
FIG. 3 is a part of a flowchart diagram of a method that is executed by some embodiments.

In some embodiments, the exercise assisting method further comprises steps S301 to S311, wherein the exercise course data further comprises a sequence of motions, the sequence of motions comprises at least a first motion and a second motion, wherein the first motion corresponds to a first motion target value and a first motion demonstration video, the second motion corresponds to a second motion target value and a second motion demonstration video. Referring to FIG. 3, in the step S301, the electronic device transmits the first control signal according to the sequence, wherein the first control signal corresponds to the first motion demonstration video. Next, in the step S303, the electronic device receives the video stream of the user.

Thereafter, in the step S305, the electronic device analyzes the video stream to generate the motion recognition result corresponding to the exercise course data of the user. Next, in the step S307, the electronic device determines whether the motion achieves the first motion target value when the motion is determined to be the first motion according to the motion recognition result.

Then, in the step S309, when it is determined that the first motion target value is not met, the electronic device inputs the motion recognition result and the first motion target value into the expert suggestion model to generate the follow-up motion suggestion and the follow-up motion demonstration video corresponding to the follow-up motion suggestion. Finally, in the step S311, the electronic device transmits a second control signal, wherein the second control signal corresponds to the follow-up motion demonstration video.

In addition to the aforesaid steps, the second embodiment can also execute all the operations and steps of the exercise assisting device 1 set forth in the first embodiment, have the same functions and deliver the same technical effects as the first embodiment. How the second embodiment executes these operations and steps, have the same functions and deliver the same technical effects as the first embodiment will be readily appreciated by those of ordinary skill in the art based on the explanation of the above embodiment, and thus will not be further described herein.

It shall be appreciated that, in the specification and the claims of the present invention, some words (including the control signal) are preceded by terms "first" or "second", and these terms "first" or "second" are only intended to distinguish different words. For example, the terms "first" and "second" in the first control signal and the second control signal are only used to represent control signals at different stages.

According to the above descriptions, the exercise assisting technology (at least including the device and the method) provided by the present invention provides the user with a motion demonstration video corresponding to the exercise course data based on the exercise course data of the user. After receiving an exercise video stream of the user, the exercise assisting technology automatically analyzes the exercise video stream to generate a motion recognition result, and determines whether the motion target value corresponding to the motion is achieved according to the motion recognition result and the exercise course data. When it is determined that the motion recognition result does not achieve the motion target value, the exercise assisting technology inputs the motion recognition result and the motion target value into an expert suggestion model to generate a follow-up motion suggestion and to determine a follow-up motion demonstration video corresponding to the follow-up motion suggestion. Moreover, the present invention can solve the problem in the prior art that the user conditions cannot be analyzed in real time to provide real-time adjustment without the need of wearable sensors, thereby effectively assisting the user in completing training.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An exercise assisting device, comprising:
a transceiver interface;
a storage, being configured to store an exercise course data of a user, a plurality of motion demonstration videos and an expert suggestion model, wherein the exercise course data comprises a motion and a motion target value corresponding to the motion, and the exercise course data corresponds to one of the plurality of motion demonstration videos;
a processor, being electrically connected to the storage and the transceiver interface, and being configured to perform the following operations:
transmitting a first control signal, the first control signal being related to one of the plurality of motion demonstration videos that corresponds to the exercise course data and is transmitted via the transceiver interface for display;
receiving a video stream of the user;
analyzing the video stream to generate a motion recognition result corresponding to the exercise course data of the user, and determining whether the motion target value corresponding to the motion is achieved according to the motion recognition result and the exercise course data;
when it is determined that the motion target value is not achieved, inputting the motion recognition result and the motion target value into the expert suggestion model to generate a follow-up motion suggestion and to determine a follow-up motion demonstration video corresponding to the follow-up motion suggestion, wherein the follow-up motion demonstration video is one of the plurality of motion demonstration videos, and wherein the follow-up motion demonstration video is distinct from the exercise course data related to the first control signal, and is transmitted via the transceiver interface for display.

2. The exercise assisting device of claim 1, wherein the exercise course data further comprises a sequence of motions, the sequence of motions comprises at least a first motion and a second motion, wherein the first motion corresponds to a first motion target value and a first motion demonstration video, the second motion corresponds to a second motion target value and a second motion demonstration video, and the processor further performs the following operations:
transmitting the first control signal according to the sequence of motions, wherein the first control signal corresponds to the first motion demonstration video;
receiving the video stream of the user;
analyzing the video stream to generate the motion recognition result corresponding to the exercise course data of the user;
determining whether the motion achieves the first motion target value when the motion is determined to be the first motion according to the motion recognition result;
when it is determined that the first motion target value is not met, inputting the motion recognition result and the first motion target value into the expert suggestion model to generate the follow-up motion suggestion and the follow-up motion demonstration video corresponding to the follow-up motion suggestion; and transmitting a second control signal, wherein the second control signal corresponds to the follow-up motion demonstration video.

3. The exercise assisting device of claim 1, further comprising the following operations when the processor analyzes the video stream:

generating an object recognition result corresponding to the motion; and determining whether the motion corresponding to the exercise course data of the user achieves the motion target value based on the object recognition result, the motion recognition result and the exercise course data.

4. The exercise assisting device of claim 3, wherein the processor generates the object recognition result through the following operations:

clipping the video stream to generate an image for an object in hand corresponding to the video stream; and recognizing a type and weight of the object in hand to generate the object recognition result.

5. The exercise assisting device of claim 1, wherein the storage further stores historical record data corresponding to the user, and the processor is further configured to input the motion recognition result, the historical record data and the motion target value into the expert suggestion model, when it is determined that the motion target value is not achieved, so as to generate the follow-up motion suggestion and to determine the follow-up motion demonstration video corresponding to the follow-up motion suggestion, wherein the historical record data comprises a plurality of historical exercise courses and the motion target value corresponding to each of the historical exercise courses.

6. The exercise assisting device of claim 1, wherein the processor further performs the following operation:

determining the motion target value corresponding to the motion through a muscle strength Repetition of Maximum (RM) evaluation method.

7. The exercise assisting device of claim 1, wherein the processor generates the motion recognition result through the following operation:

recognizing a limb motion and a number of motions of a user in the video stream to generate the motion recognition result.

8. The exercise assisting device of claim 1, wherein the processor further performs the following operations:

generating an occurrence probability corresponding to each of the follow-up motion suggestions according to the expert suggestion model; and recommending the first n follow-up motion suggestions with the greatest occurrence probabilities to the user according to the occurrence probabilities, wherein n is a positive integer.

9. The exercise assisting device of claim 1, wherein the expert suggestion model is established by one of a deep learning and a machine learning from a plurality of collected sample exercise course data, and a motion evaluation and a coach suggestion corresponding to each of the collected sample exercise course data.

10. The exercise assisting device of claim 1, wherein the exercise assisting device is further connected to a display screen and performs the following operation:

playing the follow-up motion suggestion and the follow-up motion demonstration video corresponding to the follow-up motion suggestion through the display screen.

11. The exercise assisting device of claim 1, wherein the follow-up motion demonstration video corresponding to the follow-up motion suggestion is generated by the following operations:

receiving a user feedback; and inputting the motion recognition result, the motion target value, the user feedback and the exercise course data into the expert suggestion model by the processor to generate the follow-up motion suggestion and to determine the follow-up motion demonstration video corresponding to the follow-up motion suggestion.

12. An exercise assisting method used for an electronic device, the electronic device comprising a transceiver interface, a storage and a processor, the storage storing an exercise course data of a user, a plurality of motion demonstration videos and an expert suggestion model, wherein the exercise course data comprises a motion and a motion target value corresponding to the motion, and the exercise course data corresponds to one of the plurality of motion demonstration videos, the exercise assisting method is executed by the processor and comprises:

transmitting a first control signal, the first control signal being related to one of the plurality of motion demonstration videos that corresponds to the exercise course data and is transmitted via the transceiver interface for display;

receiving a video stream of the user;

analyzing the video stream to generate a motion recognition result corresponding to the exercise course data of the user, and determining whether the motion target value corresponding to the motion is achieved according to the motion recognition result and the exercise course data;

when it is determined that the motion target value is not achieved, inputting the motion recognition result and the motion target value into the expert suggestion model to generate a follow-up motion suggestion and to determine a follow-up motion demonstration video corresponding to the follow-up motion suggestion, wherein the follow-up motion demonstration video is one of the plurality of motion demonstration videos, and wherein the follow-up motion demonstration video is distinct from the exercise course data related to the first control signal, and is transmitted via the transceiver interface for display.

13. The exercise assisting method of claim 12, wherein the exercise course data further comprises a sequence of motions, the sequence of motions comprises at least a first motion and a second motion, wherein the first motion corresponds to a first motion target value and a first motion demonstration video, the second motion corresponds to a second motion target value and a second motion demonstration video, and the exercise assisting method further comprises:

transmitting the first control signal according to the sequence of motions, wherein the first control signal corresponds to the first motion demonstration video;

receiving the video stream of the user;

analyzing the video stream to generate the motion recognition result corresponding to the exercise course data of the user;

determining whether the motion achieves the first motion target value when the motion is determined to be the first motion according to the motion recognition result;

when it is determined that the first motion target value is not met, inputting the motion recognition result and the first motion target value into the expert suggestion model to generate the follow-up motion suggestion and the follow-up motion demonstration video corresponding to the follow-up motion suggestion; and transmitting a second control signal, wherein the second control signal corresponds to the follow-up motion demonstration video.

14. The exercise assisting method of claim 12, further comprising the following when analyzing the video stream:

generating an object recognition result corresponding to the motion; and determining whether the motion corresponding to the exercise course data of the user achieves the motion target value based on the object recognition result, the motion recognition result and the exercise course data.

15. The exercise assisting method of claim 14, wherein the object recognition result is generated through the following steps:

clipping the video stream to generate an image for an object in hand corresponding to the video stream; and recognizing a type and weight of the object in hand to generate the object recognition result.

16. The exercise assisting method of claim 12, wherein the storage further stores historical record data corresponding to the user, and the exercise assisting method further comprises:

inputting the motion recognition result, the historical record data and the motion target value into the expert suggestion model, when it is determined that the motion target value is not achieved, so as to generate the follow-up motion suggestion and to determine the follow-up motion demonstration video corresponding to the follow-up motion suggestion, wherein the historical record data comprises a plurality of historical exercise courses and the motion target value corresponding to each of the historical exercise courses.

17. The exercise assisting method of claim 12, wherein the motion recognition result is generated through the following step:

recognizing a limb motion and a number of motions of a user in the video stream to generate the motion recognition result.

18. The exercise assisting method of claim 12, further comprising:

generating an occurrence probability corresponding to each of the follow-up motion suggestions according to the expert suggestion model; and recommending the first n follow-up motion suggestions with the greatest occurrence probabilities to the user according to the occurrence probabilities, wherein n is a positive integer.

19. The exercise assisting method of claim 12, wherein the expert suggestion model is established by one of a deep learning and a machine learning from a plurality of collected sample exercise course data and a motion evaluation and a coach suggestion corresponding to each of the collected sample exercise course data.

20. The exercise assisting method of claim 12, wherein the follow-up motion demonstration video corresponding to the follow-up motion suggestion is generated by the following steps:

receiving a user feedback; and inputting the motion recognition result, the motion target value, the user feedback and the exercise course data into the expert suggestion model to generate the follow-up motion suggestion and to determine the follow-up motion demonstration video corresponding to the follow-up motion suggestion.

\* \* \* \* \*